US011998506B2

(12) United States Patent
Yu et al.

(10) Patent No.: US 11,998,506 B2
(45) Date of Patent: Jun. 4, 2024

(54) SLIDING TYPE MASSAGE APPARATUS

(71) Applicant: CERAGEM CO., LTD., Cheonan-si (KR)

(72) Inventors: Ho Sang Yu, Cheonan-si (KR); Keun Young Paek, Cheonan-si (KR); Dong Myoung Lee, Asan-si (KR)

(73) Assignee: Ceragem Co., Ltd., Cheonan-si (KR)

( * ) Notice: Subject to any disclaimer, the term of this patent is extended or adjusted under 35 U.S.C. 154(b) by 676 days.

(21) Appl. No.: 17/119,713

(22) Filed: Dec. 11, 2020

(65) Prior Publication Data

US 2021/0177697 A1 Jun. 17, 2021

(30) Foreign Application Priority Data

Dec. 12, 2019 (KR) ........................ 10-2019-0165443

(51) Int. Cl.
*A61H 37/00* (2006.01)
*A61H 9/00* (2006.01)
(Continued)

(52) U.S. Cl.
CPC ..... *A61H 37/00* (2013.01); *A61H 2201/0192* (2013.01); *A61H 2201/1664* (2013.01); *A61H 2203/0443* (2013.01)

(58) Field of Classification Search
CPC ............ A61H 37/00; A61H 2201/0192; A61H 2201/1657; A61H 2201/1664;
(Continued)

(56) References Cited

U.S. PATENT DOCUMENTS 3,664,716 A * 5/1972 Johnson ............... A47B 88/487 384/19
4,803,742 A * 2/1989 Rasnick ............... A47C 17/161 5/41
(Continued)

FOREIGN PATENT DOCUMENTS

CN 103494677 A 1/2014
CN 203988851 U 12/2014
(Continued)

OTHER PUBLICATIONS

Office Action dated Oct. 8, 2022 in Chinese Application No. 202011470277.2.
(Continued)

*Primary Examiner* — Michelle J Lee
(74) *Attorney, Agent, or Firm* — Knobbe, Martens, Olson & Bear, LLP

(57) ABSTRACT

Disclosed is a sliding type massage apparatus. In more detail, the sliding type massage apparatus is configured so that an auxiliary portion supporting a lower body of a user slidably moves from a body portion supporting an upper body of the user and thus the auxiliary portion maintains horizontality while moving. To this end, there is provided a sliding type massage apparatus including a body portion configured to support an upper body of a user and an auxiliary portion connected to the body portion to be slidable in a longitudinal direction to support a lower body of the user. Here, the body portion includes first support members which are rotatable to support a bottom surface of the auxiliary portion when the auxiliary portion slides.

11 Claims, 6 Drawing Sheets

(51) Int. Cl.

| | |
|---|---|
| *A61G 13/00* | (2006.01) |
| *A61G 13/10* | (2006.01) |
| *A61H 7/00* | (2006.01) |
| *A61H 15/00* | (2006.01) |
| *A61H 15/02* | (2006.01) |

(58) Field of Classification Search

CPC ........ A61H 2203/04; A61H 2203/0443; A47C 1/034; A47C 1/0347–0352; A47C 7/50; A47C 7/506; A47C 7/5062; A47C 17/04; A47C 17/16; A47C 17/20–2073; A47C 17/32; A47C 17/86; A47C 20/00; A47C 20/04; A47C 20/042–046; A47C 19/04

See application file for complete search history.

(56) References Cited

U.S. PATENT DOCUMENTS

| | | | | |
|---|---|---|---|---|
| 2016/0038335 | A1* | 2/2016 | Park | A61H 15/00 607/96 |
| 2019/0307395 | A1 | 10/2019 | Kim et al. | |

FOREIGN PATENT DOCUMENTS

| | | | |
|---|---|---|---|
| CN | 104644374 | A | 5/2015 |
| CN | 108095965 | A | 6/2018 |
| CN | 208436010 | U | 1/2019 |
| DE | 4019902 | C1 | 11/1991 |
| JP | H11-346876 | A | 12/1999 |
| KR | 20-0236271 | Y1 | 10/2001 |
| KR | 20-0355128 | Y1 | 7/2004 |
| KR | 10-1206967 | B1 | 11/2012 |
| KR | 10-2016-0078653 | A | 7/2016 |
| KR | 10-2018-0108947 | A | 10/2018 |
| KR | 10-2037572 | B1 | 10/2019 |

OTHER PUBLICATIONS

Office Action of Indian Patent Application No. 202014053937—7 pages (dated Dec. 16, 2021).

Office action dated Jun. 17, 2023 in the corresponding Chinese Application No. 202011470277.2.

Office Action of Korean Patent Application No. 10-2019-0165443—6 pages (dated Jul. 1, 2021).

* cited by examiner (a)

(b)

SLIDING TYPE MASSAGE APPARATUS

CROSS-REFERENCE TO RELATED APPLICATION

This application claims priority to and the benefit of Korean Patent Application No. 2019-0165443, filed on Dec. 12, 2019, the disclosure of which is incorporated herein by reference in its entirety.

BACKGROUND

1. Field

The present disclosure relates to a sliding type massage apparatus.

2. Discussion of Related Technology

Generally, it is possible to receive thermal treatment at a comfortable lying posture and the spine, calves, thighs and feet may be massaged using massage apparatuses. When a massage apparatus is foldable, the massage apparatus may be easily carried and an installation area thereof may be reduced to be simply arranged.

Korean Utility Model Registration No. 20-0236271 (registered on Jun. 18, 2001) discloses the relate technology.

The disclosure of this section is to provide background information relating to the invention. Applicant does not admit that any information contained in this section constitutes prior art.

SUMMARY

The present disclosure is directed to providing a sliding type massage apparatus configured so that an auxiliary portion supporting a lower body of a user slidably moves from a body portion supporting an upper body of the user and thus the auxiliary portion maintains horizontality while moving.

However, aspects of the present invention are not limited to the above-described aspects and other aspects may also be present.

One aspect of the present invention provides a sliding type massage apparatus including a body portion configured to support an upper body of a user and an auxiliary portion connected to the body portion to be slidable in a longitudinal direction to support a lower body of the user. Here, the body portion includes first support members which are rotatable to support a bottom surface of the auxiliary portion when the auxiliary portion slides.

The body portion may include a first plate configured to directly support the upper body of the user and side frames configured to support both sides of the first plate, and the first support members may be provided on inner surfaces of the side frames.

The auxiliary portion may include a second plate configured to directly support the lower body of the user and a support leg configured to support the second plate to maintain horizontality in use. Also, first guide members supported by the first support members and extending in a sliding direction of the auxiliary portion may be provided on a bottom surface of the second plate.

Second guide members extending in the sliding direction of the auxiliary portion may be provided on the inner surfaces of the side frames. Also, second support members, which are rotatable to move along the second guide members while the auxiliary portion slides, may be provided on the auxiliary portion.

First support bars formed to extend toward the auxiliary portion may be provided on the inner surfaces of the side frames to allow the first support members to support the bottom surface of the auxiliary portion.

Second support bars formed to extend toward the side frames may be provided on the bottom surface of the second plate to allow the second support members to be inserted into and disposed in the second guide members.

The second guide members may each include a parallel movement section formed to allow the auxiliary portion to move while being parallel to the ground.

The second guide members may each include an opening-prevention section extending downward from one side of the parallel movement section and a closing-prevention section extending downward from the other side of the parallel movement section. Also, the first support may be members provided on the other side of the parallel movement section When the auxiliary portion is disposed above the body portion, the second plate may be disposed above the first plate by as much as a first height. Here, the closing-prevention section may be formed to extend downward by as much as the first height.

When the auxiliary portion is disposed above the body portion, the support leg may be spaced upward from the ground by the first height.

Rotatable third support members may be provided on a bottom end of the support leg to support the auxiliary portion when the auxiliary portion slides.

BRIEF DESCRIPTION OF THE DRAWINGS

The above and other aspects, features and advantages of the present invention will become more apparent to those of ordinary skill in the art by describing embodiments thereof in detail with reference to the accompanying drawings, in which.

DETAILED DESCRIPTION OF EMBODIMENTS

Figure 1:
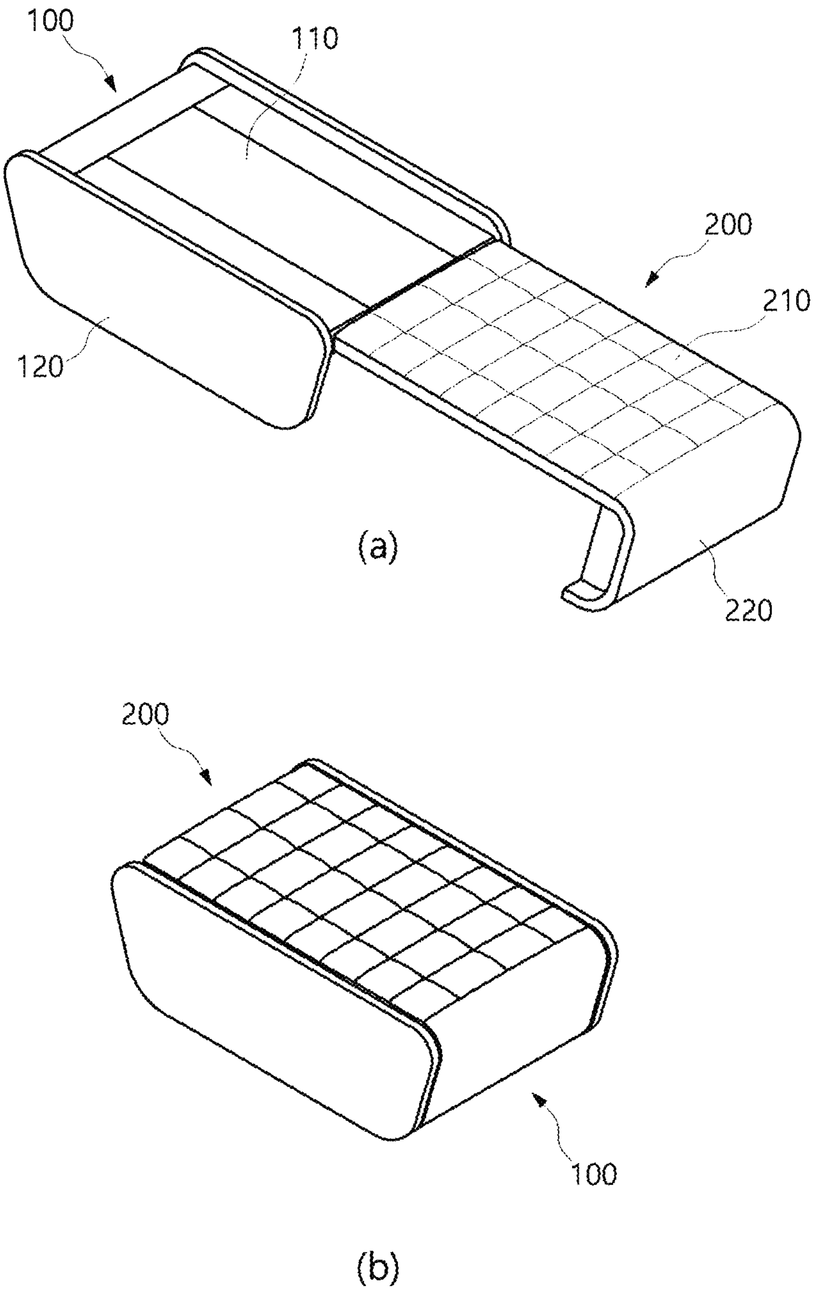
FIG. 1 shows perspective views of a sliding type massage apparatus according to one embodiment of the present invention, in which (a) OF FIG. 1 is a view illustrating a state in which an auxiliary portion is withdrawn and (b) OF FIG. 1 is a view illustrating a state in which the auxiliary portion is inserted.

Hereinafter, embodiments of the present invention will be described in detail to be implemented by one of ordinary skill in the art with reference to the drawings. The present invention may be implemented in a variety of shapes and will not be limited to the embodiments described herein. To clearly describe the present invention, a description of irrelevant parts will be omitted. Throughout the specification, like or similar components will be referred to as like reference numerals.

Throughout the specification, the terms "comprise," "have," or the like are used herein to specify the presence of implemented features, numbers, stages, operations, elements, components or combinations thereof but do not preclude the presence or addition of one or more other features, numbers, stages, operations, elements, components, or combinations thereof. Also, when it is stated that one part of a layer, film, region, plate, or the like is disposed "above" another part, not only one part may be "directly above" the other part but also another part may be present therebetween. On the other hand, when it is stated that one part of a layer, film, region, plate, or the like is disposed "below" another part, not only one part may be "directly below" the other part but also another part may be present therebetween.

In an example massage apparatus, when an on/off switch of a control unit or an on/off switch of a remote controller is turned on and then a standard or local selection switch of the control unit is turned on to input a standard or local massage control signal to a microcomputer, heat is generated by an electric heating wire built in a thermal mat to heat the back to a warm temperature and a control signal output from the microcomputer applies power to a driving motor to rotate the driving motor forward and backward at uniform cycles so that a reducer receiving a rotational driving force reduces a speed and then a driving pulley installed on an output shaft rotates clockwise or counterclockwise to pull a wire rightward or leftward to pull a support rightward or leftward repetitively. Accordingly, first and second oilless bearings move rightward or leftward along first and second guide rails and first and second rollers rotate clockwise or counterclockwise alternately so as to massage the spine, calves, and thighs.

In the example massage apparatus, it is possible to receive thermal treatment at a comfortable lying posture and the spine, calves, thighs and feet may be massaged. Also, since a particular part may be massaged and the massage apparatus is foldable, the massage apparatus may be easily carried and an installation area thereof may be reduced to be simply arranged.

In the example massage apparatus, however, it may be necessary to mount a coupling device such as a hinge or the like on two support substrates. Also, as described above, a user may feel uncomfortable manually unfolding the support substrates on the basis of the coupling device to unfold the folded support substrates.

Also, since it may be necessary to rotate the respective support substrates to fold or unfold, it may be impossible to secure a stable support structure of a massage module and the like which are built in each of the support substrates.

FIG. 1 shows perspective views of a sliding type massage apparatus according to one embodiment of the present invention, in which (a) OF FIG. 1 is a view illustrating a state in which an auxiliary portion is withdrawn and (b) OF FIG. 1 is a view illustrating a state in which the auxiliary portion is inserted.

As shown in FIG. 1, the sliding type massage apparatus according to one embodiment of the present invention includes a body portion 100 configured to support an upper body of a user and an auxiliary portion 200 connected to the body portion 100 to be slidable in a longitudinal direction to support a lower body of the user.

A massage module configured to perform a massage operation is mounted at one or more of the body portion 100 and the auxiliary portion 200.

In this case, the massage module may use a roll-shaped inductor configured to move forward and backward or include an air-pocket type module. When necessary, the massage module may be configured to supply warmth so as to increase a massage effect.

Basically, the auxiliary portion 200 is accommodated while being disposed above the body portion 100. To use the massage apparatus, the auxiliary portion 200 is slidably withdrawn from the body portion 100. When use of the massage apparatus is finished or when the massage apparatus is not in use, the auxiliary portion 200 is inserted to be located above the body portion 100.

As described above, since the auxiliary portion 200 configured to support the lower body of the user slidably moves from the body portion 100 configured to support the upper body of the user, storage or handling is easy so that user convenience may be increased.

Figure 2:
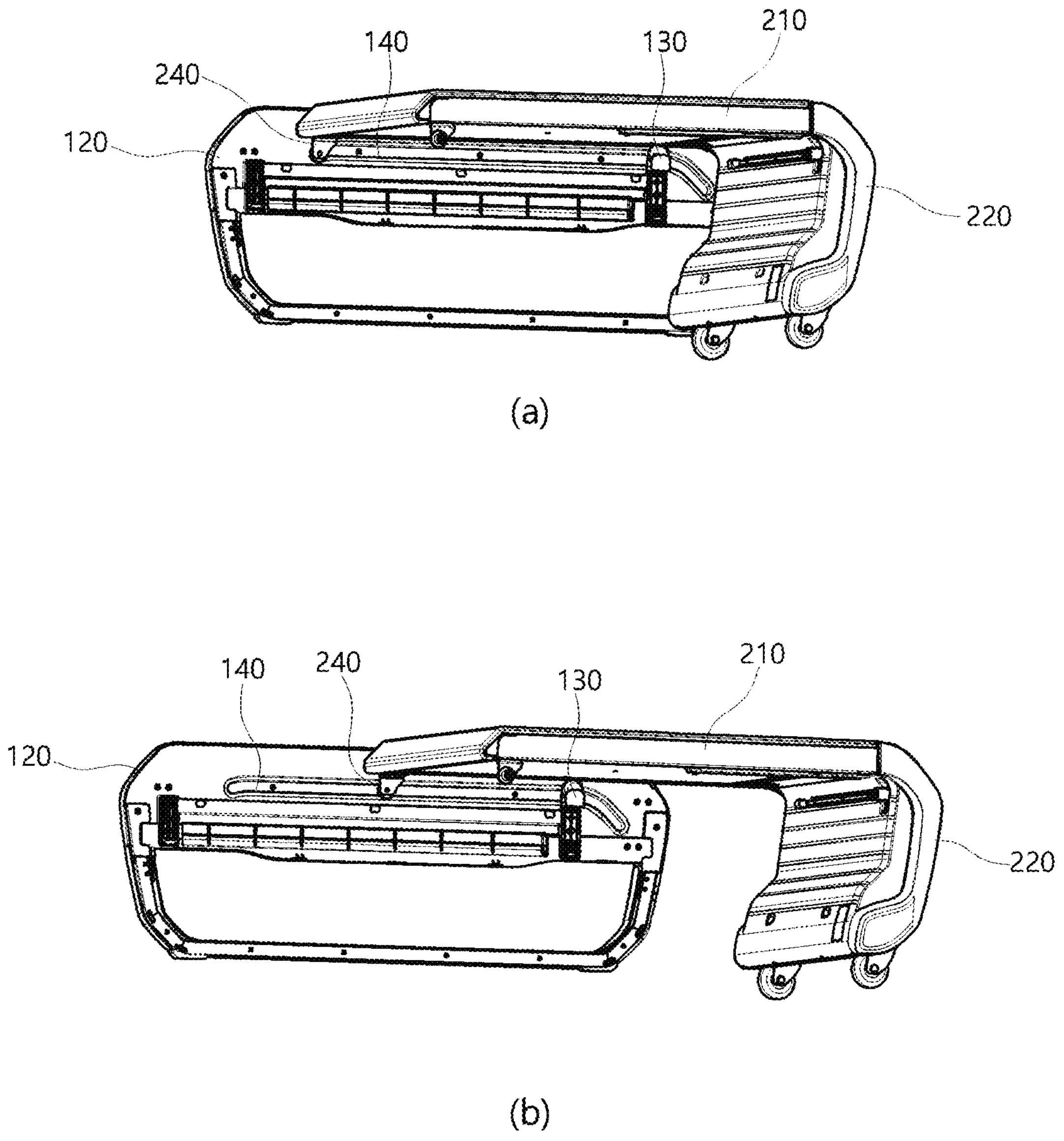
FIG. 2 shows perspective views illustrating a state in which a side frame included in the sliding type massage apparatus according to one embodiment of the present invention and the auxiliary portion are coupled to each other, in which (a) OF FIG. 2 is a view illustrating a state in which the auxiliary portion is inserted, and (b) OF FIG. 2 is a view illustrating a state in which the auxiliary portion is withdrawn.

FIG. 2 shows perspective views illustrating a state in which a side frame included in the sliding type massage apparatus according to one embodiment of the present invention and the auxiliary portion are coupled to each other, in which (a) OF FIG. 2 is a view illustrating a state in which the auxiliary portion is inserted, and (b) OF FIG. 2 is a view illustrating a state in which the auxiliary portion is withdrawn.

As shown in FIG. 2, the body portion 100 includes a first support member 130 which is rotatable to support a bottom surface of the auxiliary portion 200 when the auxiliary portion 200 slides.

In embodiments, to allow the auxiliary portion 200 to smoothly move while being disposed above the body portion 100, it is important to configure the auxiliary portion 200 to maintain horizontality. As described above, the first support member 130 is configured to support the bottom surface of the auxiliary portion 200 so that the auxiliary portion 200 may maintain horizontality while moving.

When the bottom surface of the auxiliary portion 200 is supported by the first support member 130 and the auxiliary portion 200 maintains horizontality while moving as described above, operational reliability with respect to a process of withdrawing or inserting the auxiliary portion 200 may be secured.

Here, the body portion 100 may include a first plate 110 configured to directly support the upper body of the user and side frames 120 configured to support both sides of the first plate 110. The first support member 130 may be provided on an inner surface of each of the side frames 120.

In embodiments, since the first support member 130 is provided on the inner surface of the side frame 120, the first support member 130 stably supports the bottom surface of the auxiliary portion 200 regardless of movement of the auxiliary portion 200 even when the auxiliary portion 200 is withdrawn or inserted so that the auxiliary portion 200 may move while maintaining horizontality.

Figure 3:
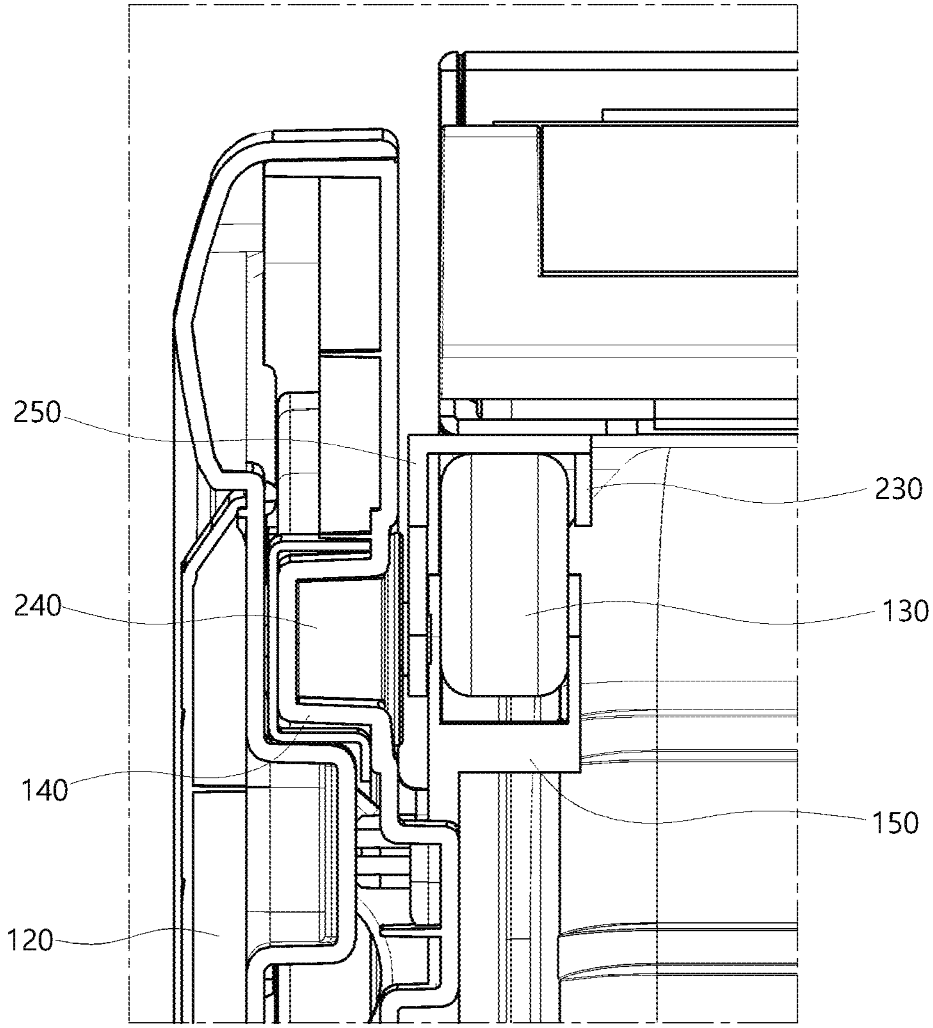
FIG. 3 is a cross-sectional view illustrating a state in which the side frame included in the sliding type massage apparatus according to one embodiment of the present invention and the auxiliary portion are coupled to each other.

FIG. 3 is a cross-sectional view illustrating a state in which the side frame included in the sliding type massage apparatus according to one embodiment of the present invention and the auxiliary portion are coupled to each other.

The auxiliary portion 200 includes a second plate 210 configured to directly support the lower body of the user and a support leg 220 configured to support the second plate 210 to maintain horizontality when the massage apparatus is used. As shown in FIG. 3, on a bottom surface of the second plate 210, first guide members 230 supported by the first support member 130 and extending in a sliding direction of the auxiliary portion 200 may be provided.

The first guide members 230 may be horizontally disposed on both sides of the bottom surface of the second plate 210 in the longitudinal direction. The first guide members 230 may be manufactured as a separate component having the shape of a pair of rails to be mounted on the bottom surface of the second plate 210, may be integrally molded with the second plate 210, or may be configured to be attachable or detachable as necessary.

In addition, the first support member 130 may be formed to have a roller or wheel shape to be slidable along the first guide member 230 and provided on the inner surface of each of the side frames 120 facing each other.

Also, as shown in FIG. 3, second guide members 140 extending in the sliding direction of the auxiliary portion 200 are provided on the inner surfaces of the side frames 120 and the auxiliary portion 200 may include a second support member 240 rotatable to move along the second guide member 140 when the auxiliary portion 200 slides.

The second guide members 140 may be provided on the inner surfaces of the side frames 120 facing each other and may be horizontally disposed in the longitudinal direction. The second guide members 140 may be manufactured as a separate component having the shape of a pair of rails to be mounted on the inner surfaces of the side frames 120, may be integrally molded with the side frames 120, or may be configured to be attachable or detachable as necessary.

In addition, the above-described second support members 240 may be formed to have a roller or wheel shape to be slidable along the second guide member 140 and may be provided on both sides of the second plates 210 of the auxiliary portion 200.

As described above, the auxiliary portion 200 moves while one side of the auxiliary portion 200 is supported by the support member 240 and the other side of the auxiliary portion 200 is supported by the first support member 130. In embodiments, since the auxiliary portion 200 moves while both the one side and other side of the auxiliary portion 200 are supported, the auxiliary portion 200 is movable while maintaining horizontality.

Here, the first support member 130 and the second support member 240 may be provided at a height where the auxiliary portion 200 can maintain horizontality.

When the auxiliary portion 200 is located above the body portion 100, a distance between the first support member 130 and the second support member 240 is the longest as shown in (a) OF FIG. 2. However, while the auxiliary portion 200 is withdrawn, the second support member 240 moves toward a rear end of the body portion 100 as shown in (b) OF FIG. 2 such that the distance between the first support member 130 and the second support member 240 is reduced. Here, the auxiliary portion 200 is supported, at two points on the bottom surface, by the first support member 130 and the second support member 240 so that the auxiliary portion 200 may maintain horizontality.

As shown in FIG. 3, to allow the first support member 130 to support the bottom surface of the auxiliary portion 200, a first support bar 150 formed to extend toward the auxiliary portion 200 may be provided on the inner surface of the side frame 120.

The first support bar 150 may be manufactured as a separate component and may be mounted on the inner surface of the side frame 120 or may be integrally molded with the side frame 120.

Also, as shown in FIG. 3, a second support bar 250 formed to extend toward the side frame 120 may be provided on a bottom surface of the second plate 210 to allow the second support member 240 to be inserted into and disposed in the second guide member 140.

The second support bar 250 may be manufactured as a separate component and mounted on the bottom surface of the second plate 210 or may be integrally molded with the second plate 210.

In addition, since the first support bar 150 and the second support bar 250 are provided as described above, the first support member 130 and the second support member 240 may be disposed at different positions along a lateral direction so as to prevent interference between the first support member 130 and the second support member 240.

Also, since the second support member 240 may continuously move along the second guide member 140 after passing the first support member 130 while the auxiliary portion 200 is withdrawn, the auxiliary portion 200 may smoothly move until the auxiliary portion 200 is completely withdrawn.

Figure 4:
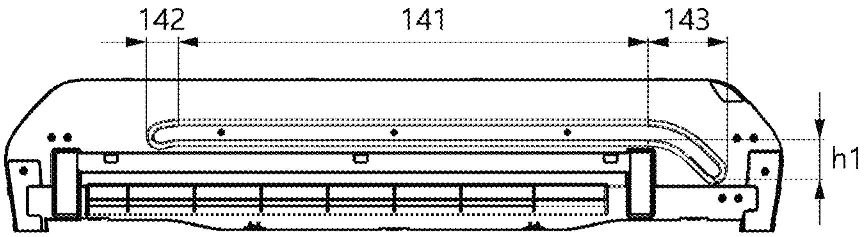
FIG. 4 is a detailed side view illustrating a second guide member of the side frame included in the sliding type massage apparatus according to one embodiment of the present invention.

FIG. 4 is a detailed side view illustrating the second guide member of the side frame included in the sliding type massage apparatus according to one embodiment of the present invention.

As shown in FIG. 4, the second guide member 140 may include a parallel movement section 141 to allow the auxiliary portion 200 to move while being parallel to the ground. In embodiments, the second support member 240 moves along the second guide member 140 so that the auxiliary portion 200 may maintain horizontality.

The second guide member 140 may include an opening-prevention section 142 extending downward from one side of the parallel movement section 141 and a closing-preventing section 143 extending downward from the other side of the parallel movement section 141.

Here, the opening-prevention section 142 and the closing-prevention section 143 may be formed to have different inclines and lengths.

In embodiments, in the case of the opening-prevention section 142, the massage apparatus is not used basically. Accordingly, a great deal of support force for preventing opening is not necessary such that the opening-prevention section 142 may be formed to have a small incline as well as a small length.

On the other hand, in the case of the closing-prevention section 143, the massage apparatus is used in earnest. Accordingly, a weight of the user is applied to the auxiliary portion 200, and a great deal of support force for preventing closing is necessary, and thus the closing-prevention section 143 may be formed to have a great incline as well as a great length.

Here, the closing-prevention section 143 may be formed to have a relatively greater incline than that of the opening-prevention section 142 as well as a relatively great length.

In addition, the above-described first support member 130 may be provided on the other side of the parallel movement section 141. In embodiments, as described above, since the second plate 210 of the auxiliary portion 200 is supported by the first support member 130 and the second support member 240 at two points, the auxiliary portion 200 maintains horizontality during a slidable movement process. A horizontal state of the auxiliary portion 200 is maintained until the first support member 130 and the second support member 240 are disposed on the same axis in a lateral direction. Accordingly, when the first support member 130 is provided on the other side of the parallel movement section 141, the horizontal state of the auxiliary portion 200 may be provided maximally so that the auxiliary portion 200 may smoothly move. When the second support member 240 of the auxiliary portion 200 passes over the first support member 130, the second support member 240 moves down in the direction of gravity along the incline of the closing-prevention section 143 so that the user may move the auxiliary portion 200 with less force.

The first support member 130 may be provided on a boundary of the parallel movement section 141 and the closing-prevention section 143.

As described above, even when the auxiliary portion 200 is withdrawn to the rear end of the body portion 100 to use the massage apparatus or recedes from the rear end of the body portion 100 after use, the second support member 240 is provided on the auxiliary portion 200 to allow the auxiliary portion 200 to be stably movable so that the user may insert or withdraw the auxiliary portion 200 with less force.

Figure 5:
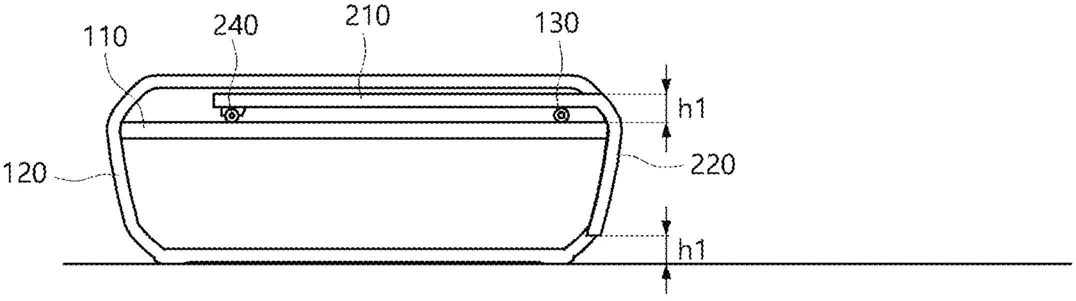
FIG. 5 shows cross-sectional views of a sliding type massage apparatus according to another embodiment of the present invention, in which (a) OF FIG. 5 is a view illustrating a state in which an auxiliary portion is inserted and (b) OF FIG. 5 is a view illustrating a state in which the auxiliary portion is withdrawn.
Figure 5:
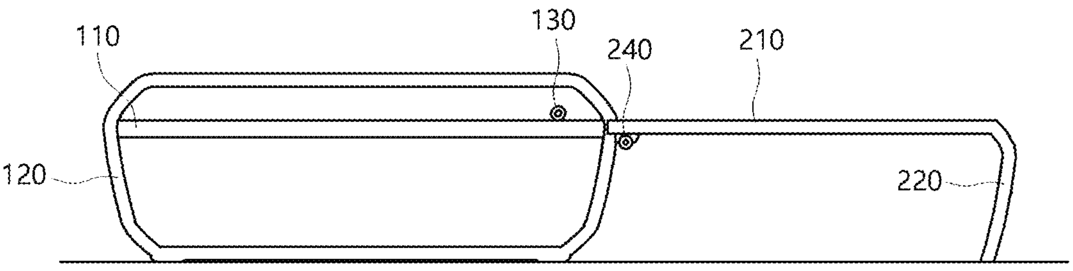

FIG. 5 shows cross-sectional views of a sliding type massage apparatus according to another embodiment of the present invention, in which (a) OF FIG. 5 is a view illustrating a state in which an auxiliary portion is inserted and (b) OF FIG. 5 is a view illustrating a state in which the auxiliary portion is withdrawn.

As shown in FIG. 5, when the auxiliary portion 200 is disposed above the body portion 100, the second plate 210 may be disposed above the first plate 110 by as much as a first height h1 and the closing-prevention section 143 may be formed to extend downward by as much as the first height h1.

In embodiments, when the massage apparatus is not used, the auxiliary portion 200 is disposed above the body portion 100. Here, it is necessary to dispose the second plate above the first plate 110 by as much as the first height h1. However, when the massage apparatus is used, it is necessary to dispose the auxiliary portion 200 at the same height as the body portion 100.

Accordingly, as described above, when the closing-prevention section 143 extends downward by as much as the first height h1, the auxiliary portion 200 moves downward along the closing-prevention section 143 such that the body portion 100 and the auxiliary portion 200 may be disposed at the same height.

Here, when the auxiliary portion 200 is disposed above the body portion 100, the support leg 220 may be spaced upward from the ground by the first height h1.

In embodiments, since the support leg 220 supporting the auxiliary portion 200 is spaced upward from the ground by the first height h1, in the state where the auxiliary part 200 is completely withdrawn, heights of the body portion 100 and the auxiliary portion 200 become equal to each other and the auxiliary portion 200 is allowed to maintain horizontality so that the user may receive a massage in a comfortable posture.

When the user applies a force in a direction of withdrawing the auxiliary portion 200 after the massage apparatus is used, the second support member 240 may move upward along the closing-prevention section 143. When the second support member 240 passes the closing-prevention section 143 and enters the parallel movement section 141, the auxiliary portion 200 may be supported by the first support member 130 and the second support member 240 at the same time so as to be inserted while maintaining horizontality.

Figure 6:
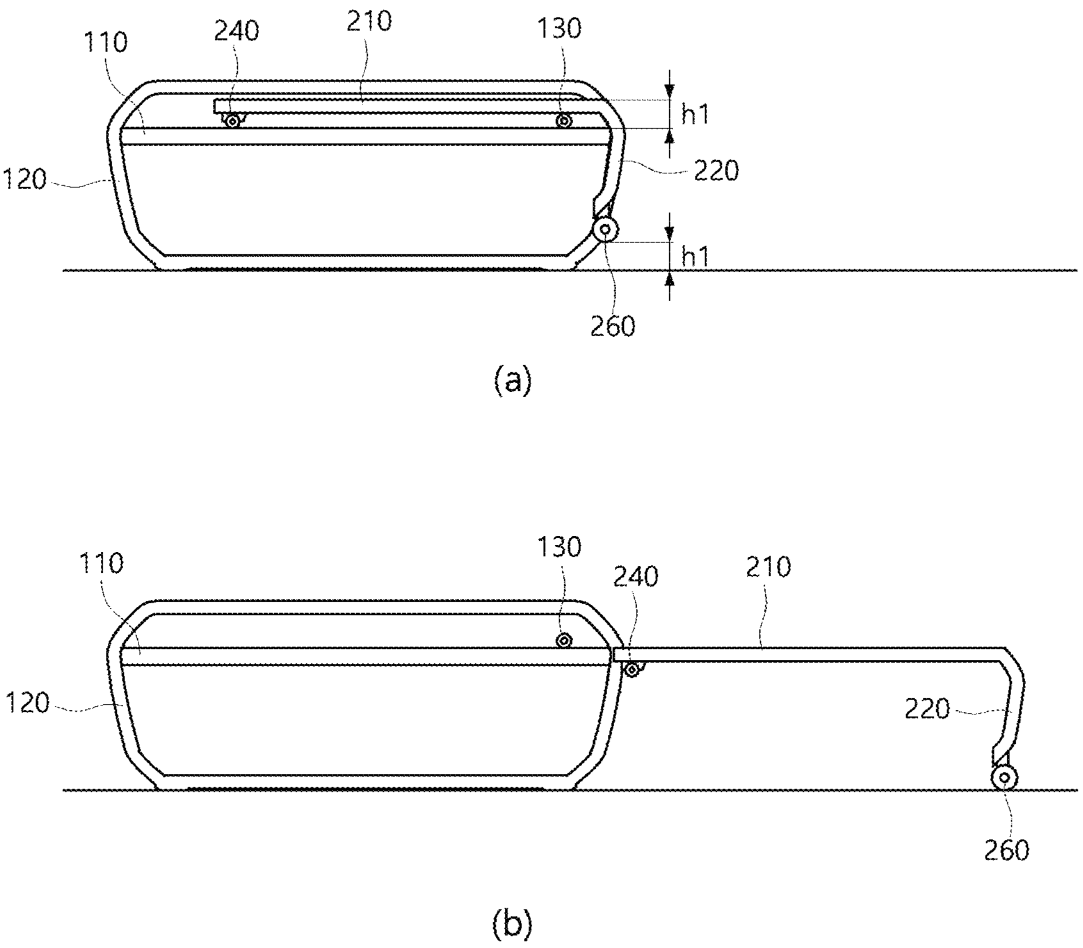
FIG. 6 shows cross-sectional views of a sliding type massage apparatus according to still another embodiment of the present invention, in which (a) OF FIG. 6 is a view illustrating a state in which an auxiliary portion is inserted and (b) OF FIG. 6 is a view illustrating a state in which the auxiliary portion is withdrawn.

FIG. 6 shows cross-sectional views of a sliding type massage apparatus according to still another embodiment of the present invention, in which (a) OF FIG. 6 is a view illustrating a state in which an auxiliary portion is inserted and (b) OF FIG. 6 is a view illustrating a state in which the auxiliary portion is withdrawn.

As shown in FIG. 6, rotatable third support members 260 are provided at the bottom end of the support leg 220 to support the auxiliary portion 200 when the auxiliary portion 200 slidably moves. Accordingly, since resistance caused by rubbing between the support leg 220 and the ground may be reduced so as to smoothly move the auxiliary portion 200, the user may insert or withdraw the auxiliary portion 200 with less force.

According to embodiments of the present invention, in a sliding type massage apparatus, since an auxiliary portion supporting a lower body of a user is slidably movable from a body portion supporting an upper body of the user, it is possible to improve user convenience.

Also, since a bottom surface of the auxiliary portion is supported by a first support member while the auxiliary portion moves and thus the horizontality of the auxiliary portion is maintained, it is possible to secure operational reliability with respect to a process of withdrawing or introducing the auxiliary portion.

In addition, even when the auxiliary portion is withdrawn to a rear end of the body portion to use the massage apparatus or the auxiliary portion recedes from the rear end of the body portion after use, since a second support member is provided in the auxiliary portion so that the auxiliary portion is stably movable, a user may introduce or withdraw the auxiliary portion with less force.

Effects of embodiments of the present invention are not limited to the above effects and should be understood as including all effects derivable from the detailed description of embodiments of the present invention or components of embodiments of the present invention disclosed in the claims.

Although the embodiments of the present invention have been described above, the concept of the present invention is not limited to the embodiment disclosed herein and it should be understood that one of ordinary skill in the art who understands the concept of the present invention may easily provide other embodiments through addition, changes, elimination, and the like of components without departing from the scope of the same concept which will be included in the scope of the concept of the present invention.

What is claimed is:

1. A sliding type massage apparatus comprising:

a body portion configured to support an upper body of a user; and an auxiliary portion connected to the body portion to be slidable in a longitudinal direction to support a lower body of the user, wherein the body portion comprises first support members which are rotatable to support a bottom surface of the auxiliary portion when the auxiliary portion slides and second guide members which are extending in the sliding direction of the auxiliary portion, wherein second support members, which are rotatable to move along the second guide members while the auxiliary portion slides, are provided on the auxiliary portion, wherein first support bars are formed on the body portion to extend in a lateral direction toward the auxiliary portion to allow the first support members to support the bottom surface of the auxiliary portion, wherein second support bars are formed to allow the second support members to be inserted into and disposed in the second guide members, and to extend so that the first support members and the second support members are disposed at a different position along the lateral direction.

2. The sliding type massage apparatus of claim 1, wherein the body portion comprises a first plate configured to directly support the upper body of the user and side frames configured to support both sides of the first plate, and the first support members are provided on inner surfaces of the side frames.

3. The sliding type massage apparatus of claim 2, wherein the auxiliary portion comprises a second plate configured to directly support the lower body of the user and a support leg configured to support the second plate to maintain horizontality in use, and first guide members supported by the first support members and extending in the sliding direction of the auxiliary portion are provided on a bottom surface of the second plate.

4. The sliding type massage apparatus of claim 3, wherein the second guide members are provided on the inner surfaces of the side frames.

5. The sliding type massage apparatus of claim 4, wherein the second guide members each comprise a parallel movement section formed to allow the auxiliary portion to move while being parallel to the ground.

6. The sliding type massage apparatus of claim 5, wherein the second guide members each comprise an opening-prevention section extending downward from one side of the parallel movement section and a closing-prevention section extending downward from an other side of the parallel movement section, and wherein the first support members are provided on the other side of the parallel movement section.

7. The sliding type massage apparatus of claim 6, wherein when the auxiliary portion is disposed above the body portion, the second plate is disposed above the first plate by as much as a first height, and wherein the closing-prevention section is formed to extend downward by as much as the first height.

8. The sliding type massage apparatus of claim 7, wherein when the auxiliary portion is disposed above the body portion, the support leg is spaced upward from the ground by the first height.

9. The sliding type massage apparatus of claim 8, wherein rotatable third support members are provided on a bottom end of the support leg to support the auxiliary portion when the auxiliary portion slides.

10. The sliding type massage apparatus of claim 4, wherein the first support bars are provided on the inner surfaces of the side frames to allow the first support members to support the bottom surface of the auxiliary portion.

11. The sliding type massage apparatus of claim 10, wherein the second support bars are provided on the bottom surface of the second plate to allow the second support members to be inserted into and disposed in the second guide members.

* * * * *